(12) United States Patent
Coakley

(10) Patent No.: US 10,675,692 B2
(45) Date of Patent: Jun. 9, 2020

(54) SYSTEMS, APPARATUSES AND METHODS OF MACHINING PIPES AND/OR PIPE FLANGES

(71) Applicant: Illinois Tool Works Inc., Glenview, IL (US)

(72) Inventor: Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 77 days.

(21) Appl. No.: 15/682,752

(22) Filed: Aug. 22, 2017

(65) Prior Publication Data

US 2018/0056408 A1    Mar. 1, 2018

Related U.S. Application Data

(60) Provisional application No. 62/379,419, filed on Aug. 25, 2016.

(51) Int. Cl.
    *B23D 21/04*    (2006.01)
    *B26D 3/16*    (2006.01)
    (Continued)

(52) U.S. Cl.
    CPC .............. *B23D 21/04* (2013.01); *B23B 3/265* (2013.01); *B23B 5/08* (2013.01); *B23B 5/14* (2013.01);
    (Continued)

(58) Field of Classification Search
    CPC .......... B23B 2215/72; B23B 2220/126; B23B 3/265; B23B 5/14; B23B 5/08; B23B 5/163; B23D 21/04; B23Q 9/0021; B26D 3/16
    See application file for complete search history.

(56) References Cited

U.S. PATENT DOCUMENTS 1,904,950 A * 4/1933 Neckerman ............... B23B 5/16
                                                    409/138
2,436,152 A * 2/1948 Richards ................. B23B 3/265
                                                    408/77
(Continued)

FOREIGN PATENT DOCUMENTS

CN    2 910 431 Y    6/2007
DE    89 05 157 U1    8/1990
(Continued)

OTHER PUBLICATIONS

E.H. Wachs SDB 412 and FF 424 User's Manual, 70 pages, published at least as early as Aug. 24, 2016.
(Continued)

*Primary Examiner* — Sara Addisu
(74) *Attorney, Agent, or Firm* — Klintworth & Rozenblat IP LLP

(57) ABSTRACT

In one example, a pipe machining apparatus is provided and includes a frame, a tool carrier coupled to and rotatable relative to the frame, a first machining apparatus including a first tool support and a first tool supported by the first tool support and a second machining apparatus including a bridge member, a second tool support supported by the bridge member, and a second tool supported by the second tool support. The first tool is configured to perform a first machining operation and the second tool is configured to perform a second machining operation different than the first machining operation. The first machining apparatus and the second machining apparatus are interchangeably couplable to and rotatable with the tool carrier.

12 Claims, 14 Drawing Sheets

(51) Int. Cl.
    *B23B 3/26*           (2006.01)
    *B23B 5/08*           (2006.01)
    *B23B 5/14*           (2006.01)
    *B23B 5/16*           (2006.01)
    *B23Q 9/00*           (2006.01)

(52) U.S. Cl.
    CPC ............... *B26D 3/16* (2013.01); *B23B 5/163* (2013.01); *B23B 2215/72* (2013.01); *B23B 2220/126* (2013.01); *B23B 2250/04* (2013.01); *B23Q 9/0021* (2013.01)

(56) References Cited

U.S. PATENT DOCUMENTS

| | | | | |
|---|---|---|---|---|
| 3,603,182 A * | 9/1971 | Jackman | ................ | B23B 5/168 82/113 |
| 3,807,047 A * | 4/1974 | Sherer | ................... | B23D 21/02 30/101 |
| 3,927,584 A * | 12/1975 | Mayfield | ................ | B23B 5/162 82/113 |
| 4,186,630 A * | 2/1980 | Lindhag | ................ | B23B 3/265 82/113 |
| 4,615,243 A * | 10/1986 | Davis | ...................... | B23B 5/163 408/161 |
| 4,624,052 A | 11/1986 | Garcia et al. | | |
| 4,677,884 A * | 7/1987 | Kwech | ................... | B23B 5/162 82/113 |
| 4,762,038 A * | 8/1988 | Olson | .................... | B23D 21/04 30/97 |
| 4,981,055 A * | 1/1991 | Vanderpol | ............... | B23B 3/265 82/113 |
| 5,429,021 A * | 7/1995 | Astle | ......................... | B23B 3/26 82/1.3 |
| 5,557,995 A * | 9/1996 | Robinson | ............... | B23B 41/00 407/103 |
| 5,603,250 A * | 2/1997 | Robinson | ............... | B23B 41/00 82/113 |
| 5,743,539 A * | 4/1998 | Vanderpol | ............ | B23B 31/201 269/236 |
| 5,775,188 A * | 7/1998 | Strait | ...................... | B23B 3/265 408/147 |
| 6,050,161 A * | 4/2000 | Tremblay | ................ | B23B 5/162 82/113 |
| 6,994,002 B2 * | 2/2006 | Moruzzi | ................. | B23B 5/162 33/520 |
| D614,215 S * | 4/2010 | Place | ........................... | D15/127 |
| 8,250,953 B2 * | 8/2012 | Hall | ......................... | B23B 3/26 82/113 |
| 9,114,458 B2 | 8/2015 | Weinberg et al. | | |
| 9,610,636 B2 | 4/2017 | Pierce et al. | | |
| 9,623,484 B2 | 4/2017 | Pierce et al. | | |
| 9,638,245 B2 | 5/2017 | Coakley | | |
| 2001/0029817 A1* | 10/2001 | Strait | ...................... | B23B 5/162 82/113 |
| 2007/0289422 A1* | 12/2007 | Place | ...................... | B23B 5/162 82/113 |
| 2011/0083537 A1* | 4/2011 | Place | ...................... | B23B 3/265 82/1.11 |
| 2011/0179933 A1* | 7/2011 | Ahn | ........................ | B23B 3/265 83/745 |
| 2013/0152748 A1 | 6/2013 | Wokan et al. | | |

FOREIGN PATENT DOCUMENTS

| | | |
|---|---|---|
| GB | 885 592 A | 12/1961 |
| WO | 2016/069076 A1 | 5/2016 |

OTHER PUBLICATIONS

E.H. Wachs Bridge Slide Accessory for Low Clearance Split Frame User's Manual, 84 pages, published at least as early as Aug. 24, 2016.
Mirage O.D. mount flange facing machine, 1 page, published at least as early as Aug. 24, 2016.
Mactech O.D. mount flange facing machine, 1 page, published at least as early as Aug. 24, 2016.
Mirage i.D. mount flange facing machine, 1 page, published at least as early as Aug. 24, 2016.
Efco combination I.D. and O.D. mount machine, 1 page, published at least as early as Aug. 24, 2016.
H&S O.D. mount split frame machine, 1 page, published at least as early as Aug. 24, 2016.
Hydratight O.D. mount flange facing machine, 1 page, published at least as early as Aug. 24, 2016.
Meridian O.D. mount flange facing machine, 1 page, published at least as early as Aug. 24, 2016.
Climax O.D. mount flange facing machine, 1 page, published at least as early as Aug. 24, 2016.
International Search Report and Written Opinion for International Patent Application No. PCT/US2017/048111 dated Nov. 20, 2017, 16 pages.
International Preliminary Report on Patentability for PCT Application No. PCT/US2017 /048111 dated Feb. 26, 2019, 10 pages.
Office Action for Canadian Patent Application No. 3,031,174 dated Oct. 10, 2019, 4 pages.

* cited by examiner

US 10,675,692 B2

SYSTEMS, APPARATUSES AND METHODS OF MACHINING PIPES AND/OR PIPE FLANGES

RELATED APPLICATIONS

The present application claims the priority benefit of U.S. Provisional Patent Application No. 62/379,419, filed Aug. 25, 2016, which is incorporated by reference herein.

FIELD OF THE INVENTION

The present disclosure generally relates to machining apparatuses and, more particularly, to apparatuses for machining pipes and/or pipe flanges.

BACKGROUND

A variety of different types of pipe machining apparatuses exist to perform various machining processes on pipes. One such process includes cutting pipes and another process includes machining or resurfacing flanges (also known as flange facing). Individuals must purchase separate machines to perform the separate machining processes, which can become expensive if numerous machines must be purchased. Additionally, a first pipe machining apparatus must be coupled to the pipe or flange to perform a first machining process, the first pipe machining apparatus must be removed after completion of the first machining process, and then the second pipe machining apparatus must be assembled and coupled to the pipe or flange to perform a second machining process. All of this set-up, assembly and disassembly is time consuming and wasteful.

Furthermore, conventional flange facing machines have limited travel distances, thereby limiting the size of a flange that may be machined and/or limiting the amount of a flange that may be machined. In some instances, flange facing machines must be unassembled and reassembled in a different configuration just to complete a single machining process. For example, ring-type joints have grooves defined in opposite surfaces of opposing pipe flanges. These grooves require both edges or surfaces of the groove to be machined. Conventional machines must be assembled to machine one edge or surface of the groove, disassembled and reassembled in a different configuration to machine the other edge or surface of the groove. Furthermore, an individual may be required to purchase a variety of machining apparatuses in order to machine a wide range of flange sizes. This is an expensive endeavor.

SUMMARY

The present disclosure is defined by the following claims, and nothing in this section should be taken as a limitation on those claims.

In one aspect, a pipe machining apparatus is provided.

In one aspect, a pipe machining apparatus is provided and is configured to support a plurality of interchangeable machining accessories with each accessory configured to perform a different machining operation.

In one aspect, a pipe machining apparatus is provided and configured to support a machining accessory capable of performing a first machining operation and a second machining operation different than the first machining operation.

In one aspect, a pipe machining apparatus is provided and configured to support a machining accessory including a first tool support supporting a first tool and a second tool support supporting a second tool. The first and second tools are configured to engage a flange of a pipe to perform a machining operation.

In one aspect, a pipe machining apparatus is provided and configured to support a machining accessory including a first tool support supporting a first tool and a second tool support supporting a second tool. The first tool is configured to engage a flange of a pipe to machine a first portion of a groove therein and the second tool is configured to engage the flange and machine a second portion of the groove.

In one aspect, the first portion of the groove is a first angled side of the groove and the second portion of the groove is a second angled side of the groove.

In one aspect, the first and second angled sides of the groove form a generally "V" shape.

In one aspect, the first tool and the second tool are positioned on opposite sides of the pipe machining apparatus.

In one aspect, the machining accessory also includes a bridge member supported at its ends by support members and extending across the pipe machining apparatus.

In one aspect, the first tool is supported at a first end of the bridge member and the second tool is supported at a second end of the bridge member.

In one aspect, a pipe machining apparatus is provided and includes a frame, a tool carrier coupled to and rotatable relative to the frame, and a first machining apparatus including a tool support and a tool supported by the tool support. The tool is configured to perform a first machining operation. The pipe machining apparatus also includes a second machining apparatus including a bridge member, a second tool support supported by the bridge member, and a second tool supported by the tool support and configured to perform a second machining operation different than the first machining operation. The first machining apparatus and the second machining apparatus are interchangeably couplable to and rotatable with the tool carrier.

In one aspect, a pipe machining apparatus is provided and includes a frame, a tool carrier coupled to and rotatable relative to the frame, and a first machining apparatus including a first tool support and a first tool supported by the first tool support. The first tool is configured to perform a first machining operation. The pipe machining apparatus also includes a second machining apparatus including a bridge member, a second tool support supported by the bridge member, and a second tool supported by the second tool support. The second tool is configured to perform a second machining operation different than the first machining operation. The first machining apparatus and the second machining apparatus are interchangeably couplable to and rotatable with the tool carrier.

In one aspect, the first machining operation may include at least one of facing a flange of a pipe and cutting through a pipe, and the second machining operation may include at least one of facing a flange of the pipe and cutting a groove in a flange of the pipe.

In one aspect, the second tool may be configured to perform a third machining operation different than the first and second machining operations.

In one aspect, the first machining operation may include cutting through a pipe, the second machining operation may include facing a flange of the pipe and the third machining operation may include cutting a groove in the flange of the pipe.

In one aspect, the tool carrier may include a first coupling location and a second coupling location. The first machining apparatus may be coupled to the tool carrier at one of the first coupling location or the second coupling location, and the second machining apparatus may be coupled to the tool carrier at both the first coupling location and the second coupling location.

In one aspect, the tool carrier may define an opening therein, and, when the second machining apparatus is coupled to the tool carrier, the bridge member may extend across the opening.

In one aspect, when the first machining apparatus is coupled to the one of the first coupling location and the second coupling location, a counter-balance may be coupled to the tool carrier at the other of the first coupling location and the second coupling location.

In one aspect, the pipe machining apparatus may further comprise a third machining apparatus that may include a third tool support and a third tool supported by the third tool support. The third tool may be configured to perform a third machining operation.

In one aspect, the first machining operation may include cutting through a pipe, the second machining operation may include at least one of facing a flange of the pipe and cutting a groove in the flange of the pipe, and the third machining operation may include facing the flange of the pipe.

In one aspect, the second machining apparatus may include a third tool support supported by the bridge member and a third tool supported by the third tool support. The third tool may be configured to perform a third machining operation different than the first machining operation.

In one aspect, the second and third machining operations may be the same machining operation.

In one aspect, the second and third machining operations may be facing a flange of a pipe.

In one aspect, the second tool may face a first portion of the flange and the third tool may face a second portion of the flange.

In one aspect, the second and third machining operations may be cutting a groove in a flange of a pipe.

In one aspect, the second tool may cut a first portion of the groove and the third tool may cut a second portion of the groove.

In one aspect, a pipe machining apparatus is provided and includes a frame and a tool carrier coupled to and rotatable relative to the frame. The tool carrier defines an opening therein. The pipe machining apparatus also includes a machining apparatus including a bridge member coupled to the tool carrier and extending across the opening of the tool carrier, a first tool support coupled to the bridge member and supporting a first tool, and a second tool support coupled to the bridge member and supporting a second tool.

In one aspect, the first tool and the second tool may be configured to jointly perform a machining operation.

In one aspect, the machining operation may be at least one of facing a flange of a pipe and cutting a groove in a flange of a pipe.

In one aspect, when the machining operation is facing a flange, the first tool may be configured to face a first portion of the flange and the second tool may be configured to face a second portion of the flange. When the machining operation is cutting a groove, the first tool may be configured to cut a first portion of the groove and the second tool may be configured to cut a second portion of the groove.

In one aspect, the first tool and the second tool may be configured to jointly perform a plurality of machining operations.

In one aspect, the plurality of machining operations may include facing a flange of a pipe and cutting a groove in a flange of a pipe.

In one aspect, the pipe machining apparatus may further include an advancing mechanism coupled to the bridge member and configured to move the bridge member, the first tool support, the first tool, the second tool support, and the second tool relative to the tool carrier.

In one aspect, during movement as a result of the advancing mechanism, the first tool may move from an outer diameter of a flange of a pipe toward an inner diameter of the flange, and the second tool may move from the inner diameter of the flange toward an outer diameter of the flange.

In one aspect, the first and second tool supports may be selectively coupled to the bridge member and positions of the first and second tool supports may be adjustable along the bridge member.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
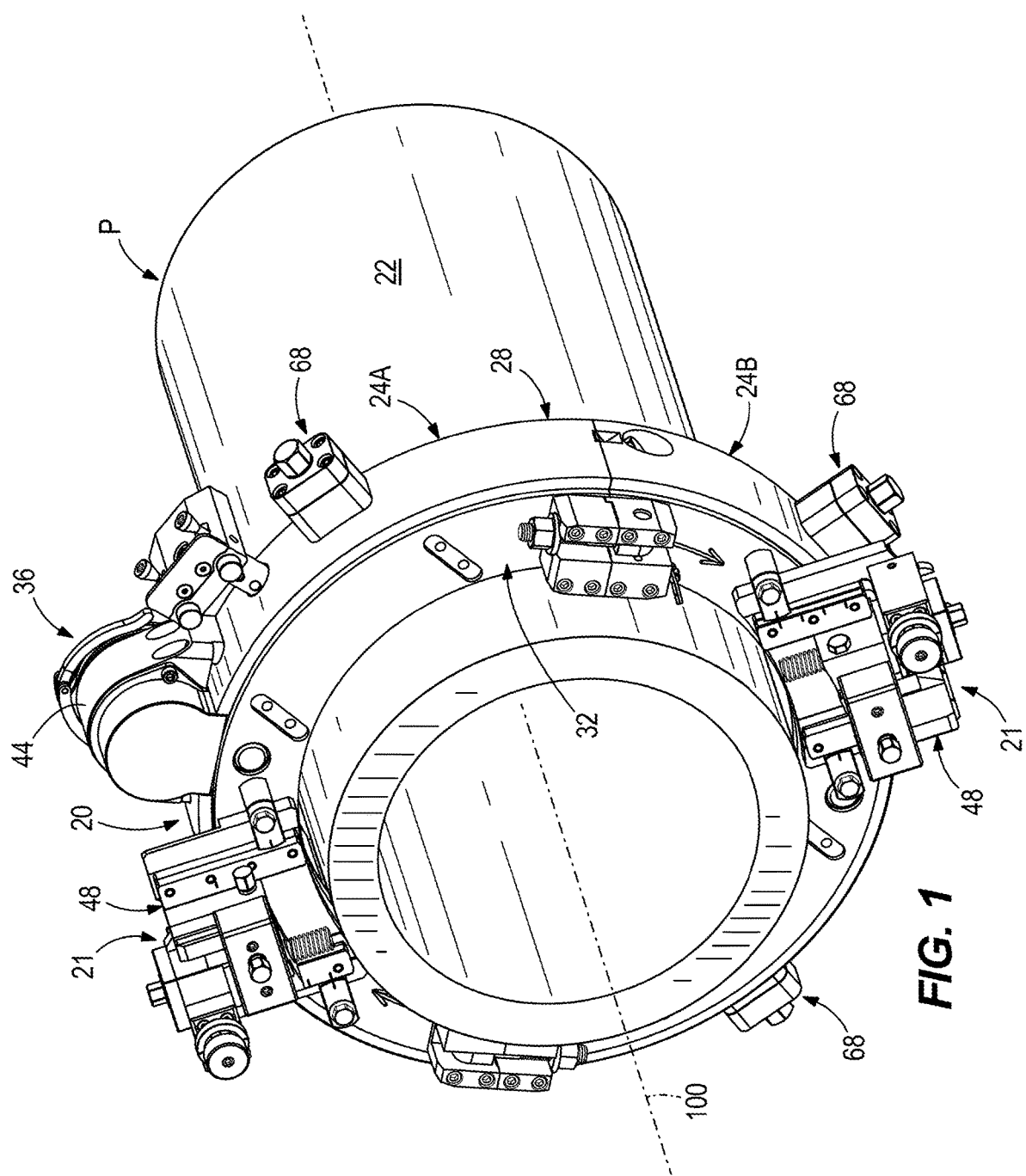
FIG. 1 is a top front perspective view of one example of a pipe machining apparatus coupled to a pipe with the pipe machining apparatus capable of supporting a plurality of machining accessories, the pipe machining apparatus is shown with one example of a machining apparatus capable of cutting a pipe, in accordance with one embodiment.
Figure 2:
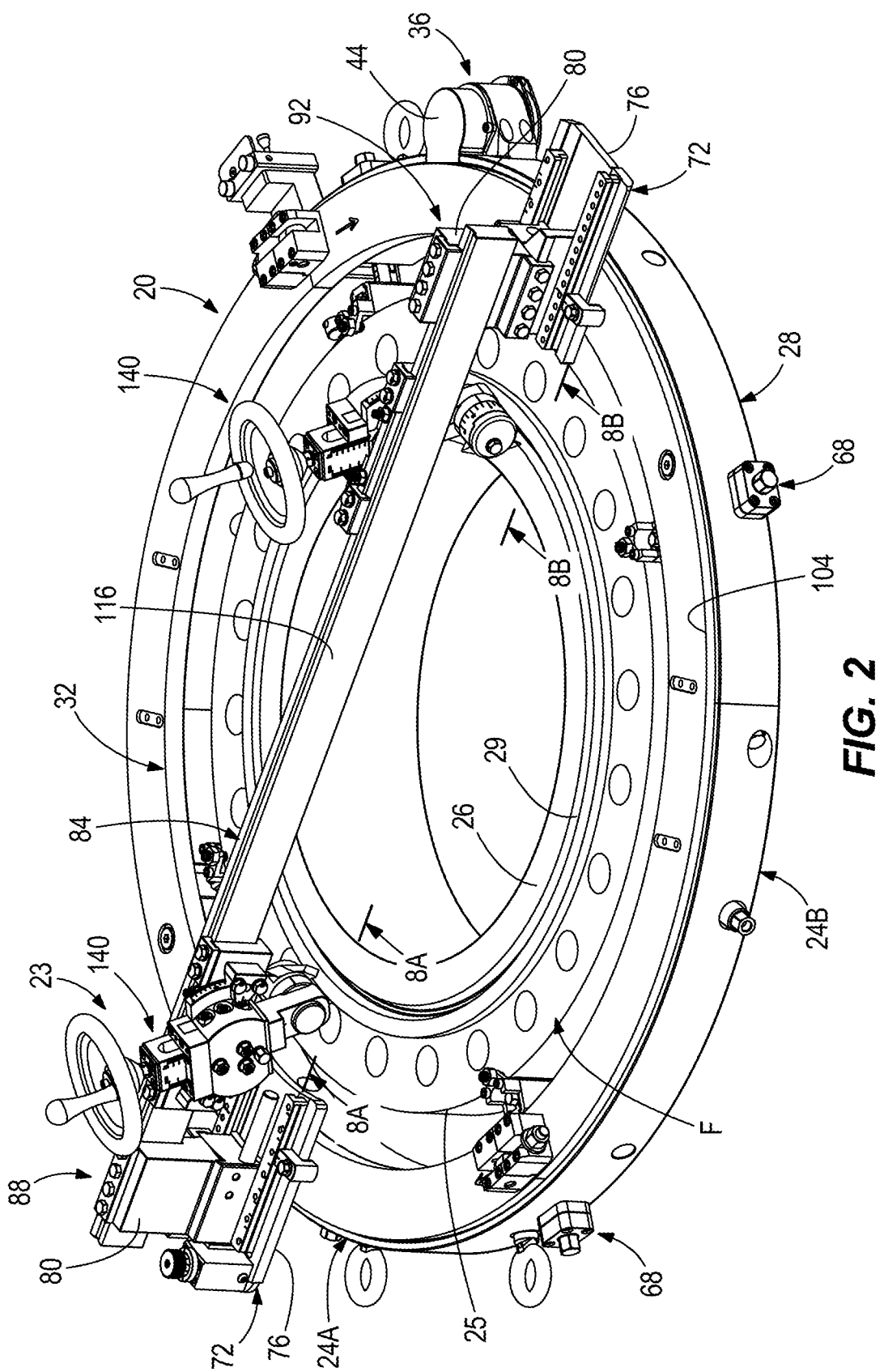
FIG. 2 is a top front perspective view of the pipe machining apparatus shown in FIG. 1 coupled to a flange of a pipe with the pipe machining apparatus capable of supporting a plurality of machining accessories, the pipe machining apparatus is shown with another example of a machining apparatus capable of machining a surface of the flange, in accordance with one embodiment.
Figure 3:
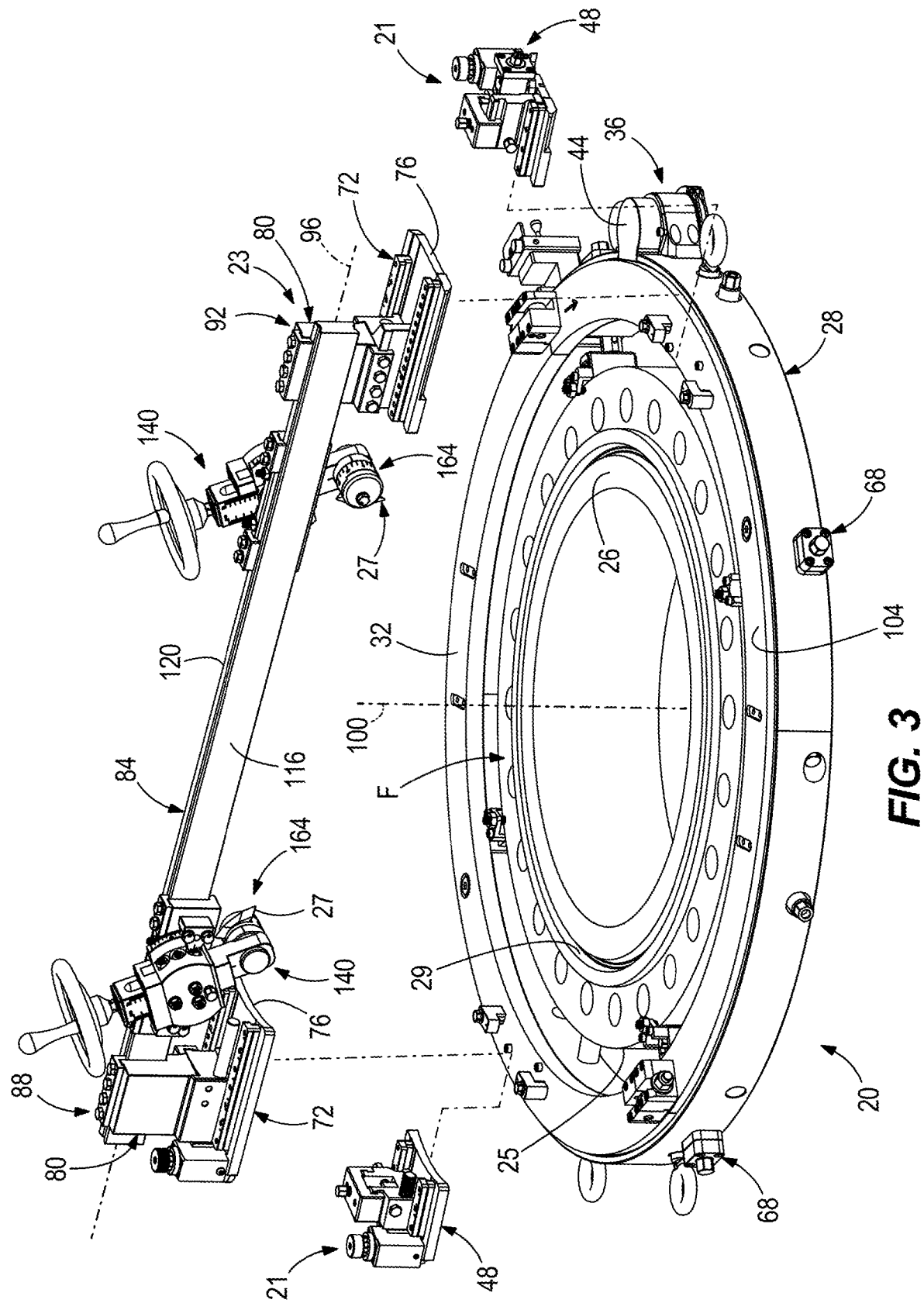
FIG. 3 is an exploded view of the pipe machining apparatus shown in FIGS. 1 and 2 showing the interchangeable coupling of the plurality of machining accessories, in accordance with one embodiment.

With reference to FIGS. 1-3, one example of a pipe machining apparatus 20 is shown and is configured to machine pipes P and flanges F of varying sizes and diameters. In some examples, the pipe machining apparatus 20 is configured to perform a plurality of machining operations or functions. In such examples, the pipe machining apparatus 20 is configured to support a plurality of machining members or accessories with each machining member configured to perform a different machining operation.

For example, with reference to FIG. 1, the pipe machining apparatus 20 includes a pair of first machining apparatuses or accessories 21 configured to perform a first machining operation. In this example, the first machining apparatuses 21 are tool supports configured to support cutting tools and the combination tool supports and cutting tools are configured to perform the first machining operation, which is comprised of cutting through a pipe P. In this example, the pipe machining apparatus 20 is coupled to an outer surface 22 of the pipe P and the tools initially engage the outer surface 22 of the pipe and proceed inward to cut through the pipe P. The pipe machining apparatus 20 includes a tool advancing mechanism, which is conventional in the art.

Also, for example, with reference to FIG. 2, the pipe machining apparatus 20 includes a second machining apparatus or accessory 23 configured to perform a second machining operation. In this example, the pipe machining apparatus 20 is coupled to an outer surface 25 of a flange F of a pipe P and the second machining operation includes machining a surface 26 of the flange F. In this example, the second machining apparatus 23 includes two tools 27 (see FIG. 3) that engage the surface 26 of the flange F to cut a groove 29 into the surface 26 of the flange F. In some examples, the groove 29 cut by the second machining apparatus 23 may be referred to as part of a ring-type joint. Similarly to the first machining apparatus 21 illustrated in FIG. 1, the second machining apparatus 23 may be advanced with the same conventional tool advancing mechanism.

Referring now to FIG. 3, the plurality of machining apparatuses 21, 23 may be interchangeably coupled to and supported by the pipe machining apparatus 20 to interchangeably perform the plurality of machining operations. It should be understood that while the illustrated example shows two machining apparatuses and two associated machining operations, the pipe machining apparatus 20 is capable of including and supporting any number of machining apparatuses which are capable of performing any number of machining operations. The machining apparatus interchangeability feature of the pipe machining apparatus 20 provides the pipe machining apparatus 20 with a wide range of capabilities, thereby precluding the necessity for purchasing a wide variety of separate machines each having a single machining operation or capability.

With continued reference to FIGS. 1-3, the illustrated example of the pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear adapted to couple with a suitable drive motor 44. The frame 28 is adapted to couple and be fixed relative to a pipe P and/or flange F, and the tool carrier 32 is rotatable relative to the fixed frame 28, the pipe P and/or the flange F. The motor 44 is adapted to rotate the tool carrier 32 relative to the frame 28 through a gear train in the column 36. The tool carrier 32 has a circular gear rack for meshing with the pinion gear rotatably mounted in column 36. In some examples, the pinion gear may have an opening provided with a polygonal perimeter for receiving a complementary shaped drive head of drive motor 44. Therefore, it can be seen that drive motor 44 is adapted to rotate tool carrier 32 relative to the frame 28 through a gear train provided by pinion gear in column 36 and circular gear rack on the tool carrier 32.

With reference to FIGS. 1-3, the pipe machining apparatus 20 further includes a plurality of adjustable clamp members or coupling members 68 engageable with the exterior surface 22 of the pipe P or the exterior surface 25 of the flange F to couple and concentrically locate the apparatus 20 to the pipe P or flange F. In some examples, the coupling members 68 have suitable adjustability to properly position the pipe machining apparatus 20 on the pipe P or the flange F.

With reference to FIGS. 1 and 3, the first machining apparatus 21 includes one or more tool supports 48 (two tool supports shown in the illustrated example), which support tools for performing the first machining operation to the pipe P as the tools rotate circumferentially about the pipe P. The first machining operation performed by the tool(s) may be a wide variety of operations including, but not limited to, forming a straight edge cut in the pipe P perpendicular to a longitudinal extent of the pipe P, forming a bevel on an end of the pipe P that is transverse to the longitudinal extent of the pipe P and at an angle other than ninety degrees, or forming an edge of a pipe P having any angle relative to the longitudinal extent of the pipe P.

With reference to FIGS. 2 and 3, the second machining apparatus 23 includes a pair of support members 72 with the support members 72 coupled to the tool carrier 32 on opposite sides of the pipe machining apparatus 20. Each support member 72 includes a base 76 rigidly coupled to the tool carrier 32 and a movable housing 80 supported by and moveable relative to the base 76. The movable housing 80 is movable or translatable by the advancement mechanism.

The second machining apparatus 23 also includes a bridge member 84 coupled near a first end 88 thereof to one of the support members 72 and coupled near a second end 92 thereof to the other of the support members 72. In the illustrated example, the bridge member 84 extends across the pipe machining apparatus 20 from one side thereof to the other, opposite side thereof. Additionally, in the illustrated example, the bridge member 84 extends across the flange F of the pipe P and an opening in the pipe P.

Figure 4:
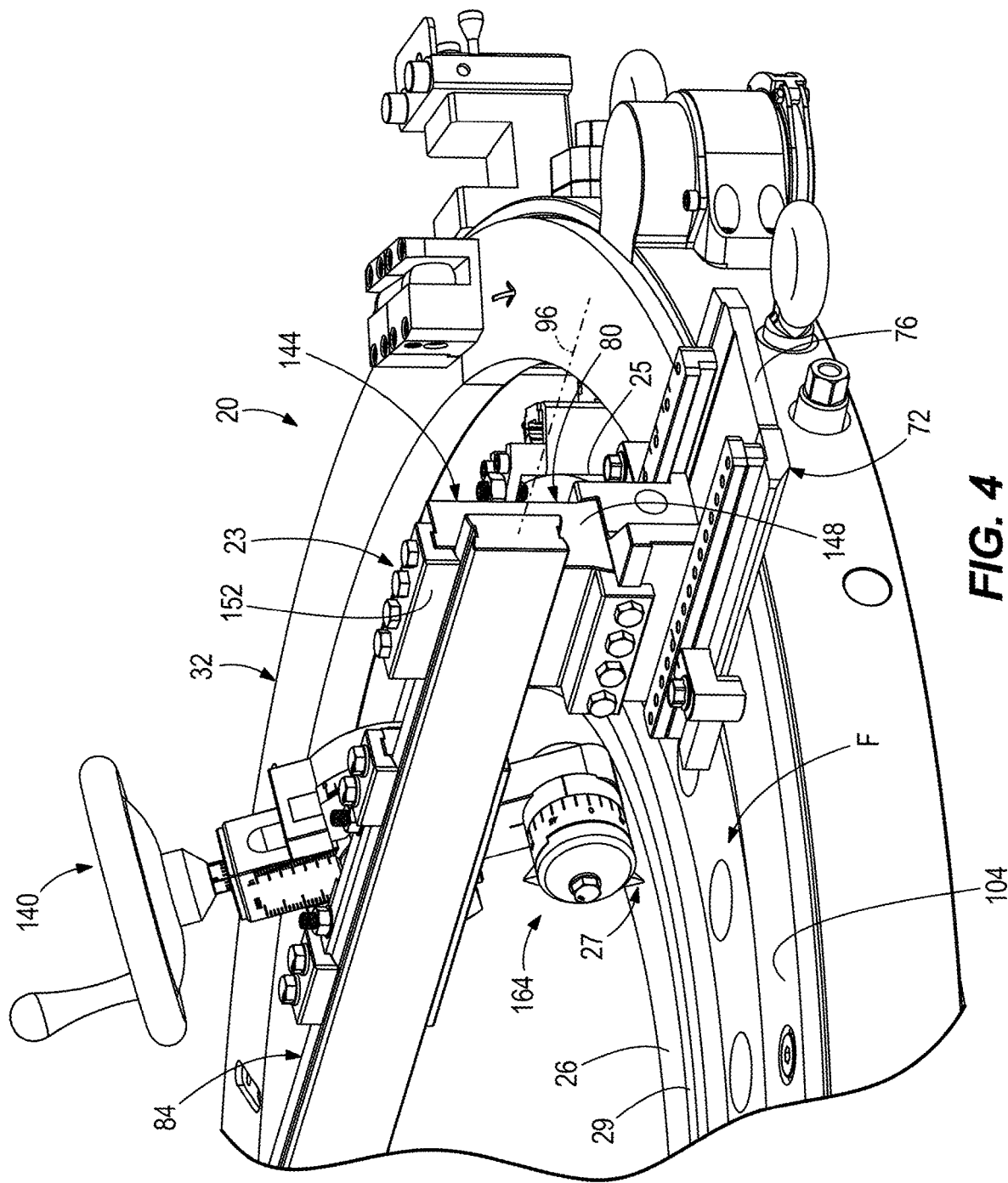
FIG. 4 is an enlarged top perspective view of a portion of the machining accessory shown in FIG. 2 and capable of machining a surface of the flange, in accordance with one embodiment.
Figure 5:
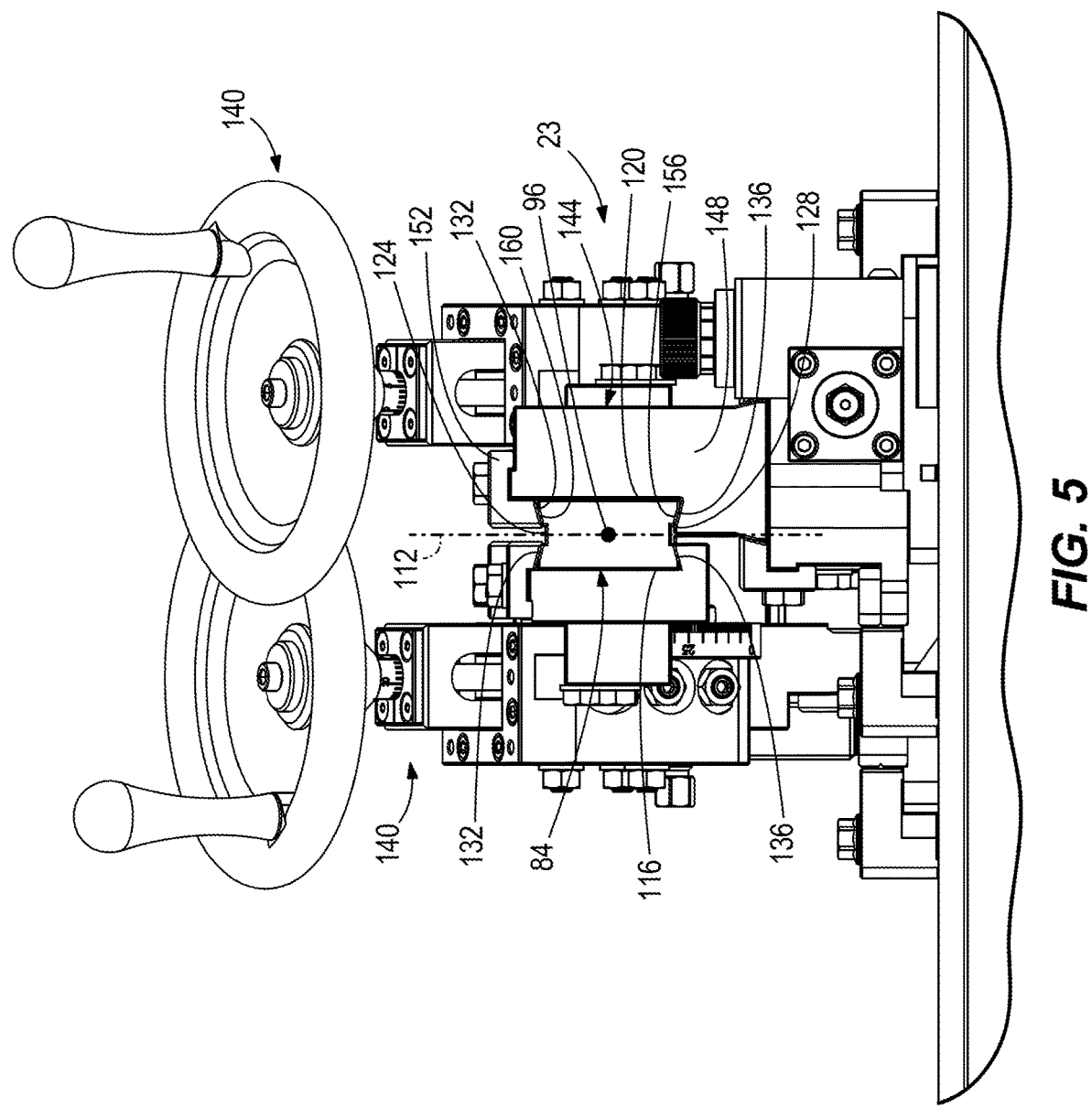
FIG. 5 is an elevation view of the machining accessory shown in FIG. 2 as viewed from an end of a bridge member or support member, in accordance with one embodiment.

With particular reference to FIGS. 4 and 5, the bridge member 84 is elongated in shape and has a longitudinal extent extending along a longitudinal axis 96, which, in some examples, extends through a center of the bridge member 84 and is generally perpendicular to a longitudinal axis 100 of the pipe P. In other examples, the longitudinal axis 96 of the bridge member 84 is parallel to at least one of a surface 26 of the flange F and/or a surface 104 of the tool carrier 32. In further examples, the longitudinal axis 96 of the bridge member 84 may extend radially relative to the pipe P and/or the flange F. In one example, the bridge member 84 may define a plurality of holes or apertures therein. Such holes may decrease the overall weight of the bridge member 84, while still providing the necessary strength and rigidity to the bridge member 84 to enable proper performance thereof. In other examples, the bridge member 84 may not include apertures.

With particular reference to FIG. 5, in the illustrated example, the bridge member 84 is symmetrical about a central plane 112 extending through a center of the bridge member 84 and generally parallel to first and second opposing surfaces 116, 120 of the bridge member 84. In the illustrated example, the bridge member 84 includes a first channel 124 defined therein in a first side of the bridge member 84 and extending along a length of the bridge member 84, and a second channel 128 defined therein in a second side of the bridge member 84 opposite the first side and extending along the length of the bridge member 84. On the first side of the bridge member 84, the bridge member 84 includes a first pair of angled surfaces or converging surfaces 132 angling or converging toward the first channel 124. On the second side of the bridge member 84, the bridge member 84 includes a second pair of angled surfaces or converging surfaces 136 angling or converging toward the second channel 128.

With continued reference to FIGS. 2 and 3 and with further reference to FIGS. 4-7, the illustrated example of the second machining apparatus 23 also includes a plurality of tool supports 140 coupled to and supported by the bridge member 84. It should be understood that the second machining apparatus 23 is capable of supporting and having coupled thereto any number of tool supports 140 (e.g., including one tool support or more than two tool supports) and all of such possibilities are intended to be within the spirit and scope of the present disclosure. In the illustrated example, each tool support 140 includes a coupling member 144 configured to couple the tool support 140 to the bridge member 84. Each coupling member 144 is adjustable to facilitate selective coupling and uncoupling of the coupling member 144 to and from the bridge member 84. In the illustrated example, the coupling member 144 includes a base 148 and a movable member 152 movable relative to the base 148. The base 148 includes a first angled surface 156 configured to engage one of the angled surfaces of the bridge member 84 on a first side of the plane 112 and the movable member 152 includes a second angled surface 160 configured to engage the other of the angled surfaces of the bridge member 84 on the same first side of the plane 112. In the illustrated example, the angled surfaces of the bridge member 84 and the angled surfaces of the coupling member 144 are complementarily shaped to facilitate secure and adequate engagement and coupling between the tool support 140 and the bridge member 84. In some examples, the engagement and/or coupling of the tool support 140 and the bridge member 84 may be referred to as a dovetail engagement and/or dovetail coupling.

The symmetrical shape of the bridge member 84 and the complementarily shape of the coupling members 144 of the tool supports 140 allow the tool supports 140 to be coupled to the bridge member 84 at any location along the bridge member 84 and on either side of the central plane 112 of the bridge member 84.

Figure 6:
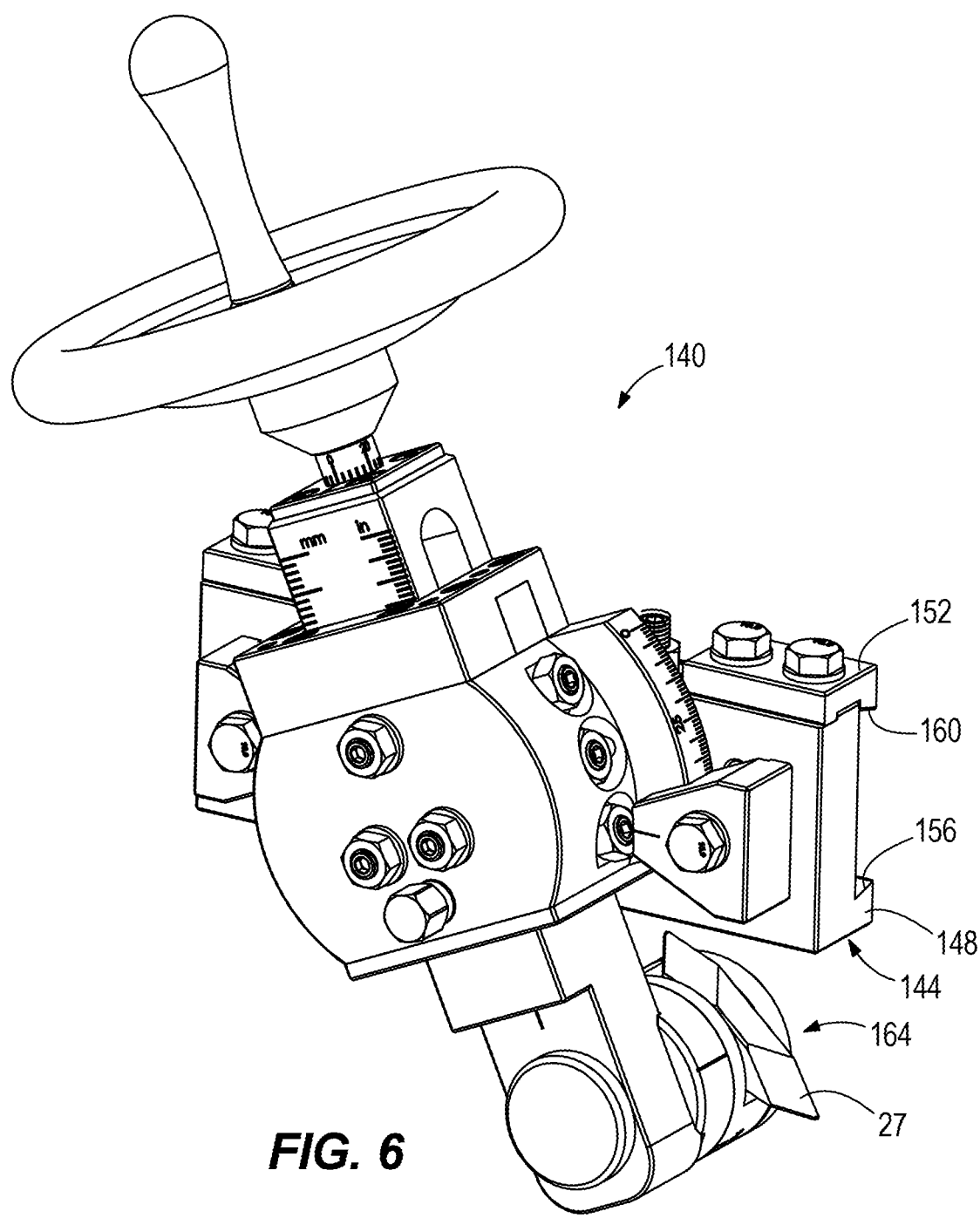
FIG. 6 is a top perspective view of one example of a tool support of the machining accessory shown in FIG. 2, in accordance with one embodiment.
Figure 7:
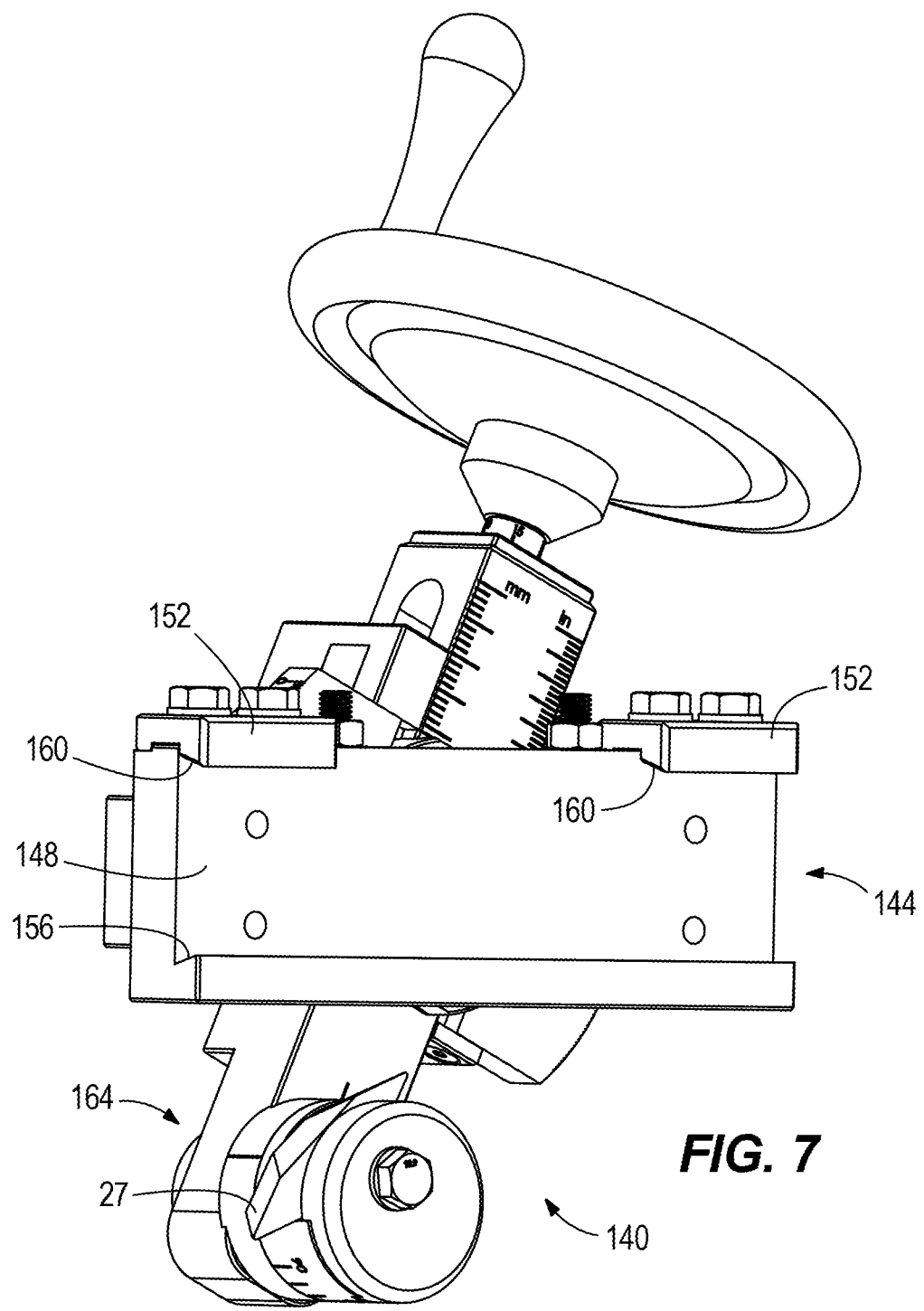
FIG. 7 is a bottom perspective view of the tool support shown in FIG. 6, in accordance with one embodiment.

Referring now to FIGS. 4, 6 and 7, the tool supports 140 are illustrated. The tool supports 140 are substantially similar in structure, configuration and operation. Accordingly, only one of the tool supports 140 will described herein in detail with it being understood that the description herein may apply to all the tool supports 140. In addition to each tool support 140 including a coupling member 144 as previously described, each tool support 140 including a tool holder 164 configured to hold and support a tool 27. The tool 27 is configured to engage and machine a surface 26 of a flange F. The tool holder 164 may be adjusted to adjust a distance the tool 27 projects from the tool holder 164. Additionally, the angle or orientation of the tool 27 may be adjusted relative to a flange F to be machined. For example, in the illustrated example shown in FIG. 7, the tool 27 has its longitudinal extent oriented in a generally vertical manner (as shown in the figure). The tool 27 may be adjusted to have its longitudinal extent oriented at any angle offset from the vertical orientation illustrated in FIG. 7. This adjustability may adjust the manner in which the tool 27 machines the surface 26 of the flange F.

Figure 8A:
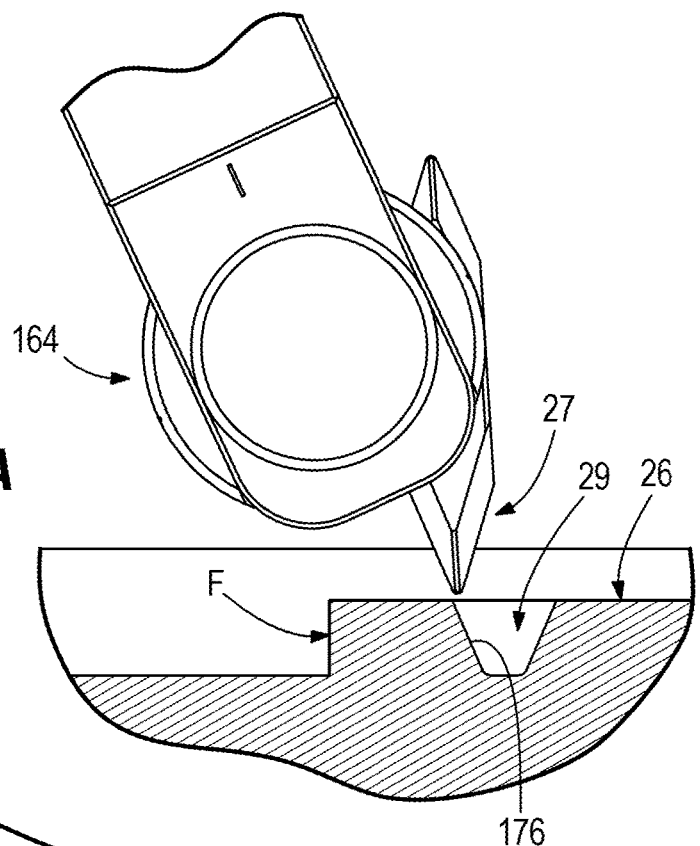
FIG. 8A is a cross-sectional view taken along line 8A-8A in FIG. 2 of a portion of the pipe machining apparatus, the machining accessory shown in FIG. 2 and the flange, wherein the cross-sectional view shows a first tool supported by a first tool holder and configured to perform a first machining operation to a first side of a groove defined in the flange of a pipe, in accordance with one embodiment.
Figure 8B:
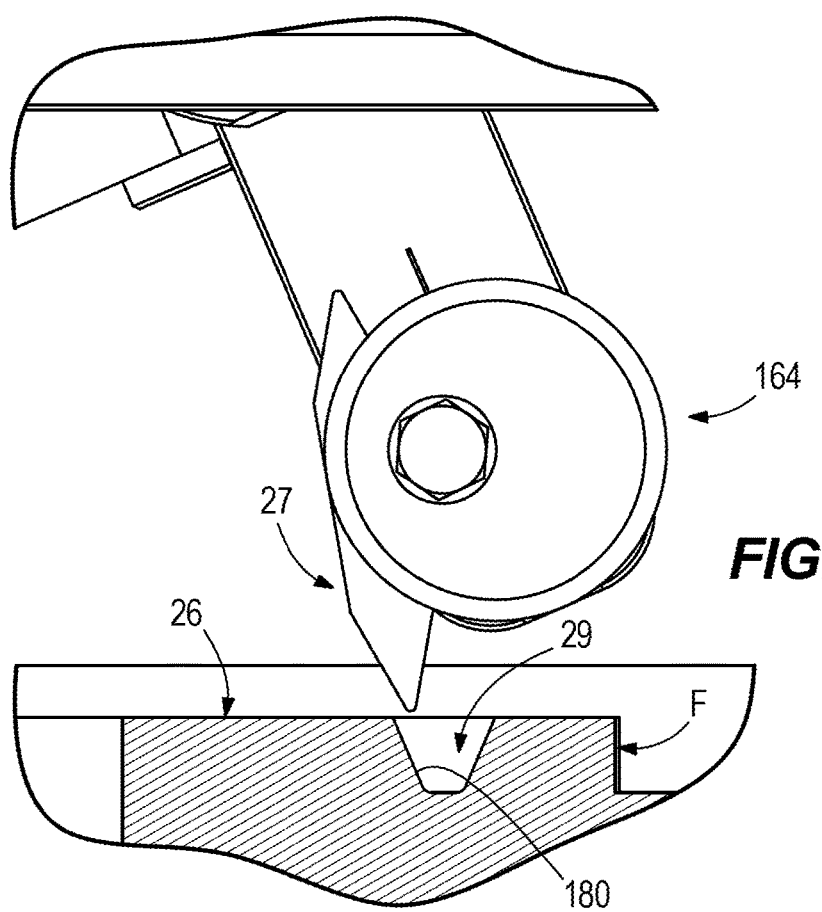
FIG. 8B is a cross-sectional view taken along line 8B-8B in FIG. 2 of a portion of the pipe machining apparatus, the machining accessory shown in FIG. 2 and the flange, wherein the cross-sectional view shows a second tool supported by a second tool holder and configured to perform a first machining operation to a second side of a groove defined in the flange of a pipe, in accordance with one embodiment.

Referring now to FIGS. 2, 8A and 8B, operation of the second machining apparatus 23 will be described in more detail. In this illustrated example, the second machining apparatus 23 is capable of performing the second machining operation, which is comprised of machining or cutting a groove 29 into a surface 26 of the flange F that is capable of receiving a sealing member 172 (see FIG. 9). This type of operation may be referred to as forming a ring-type joint groove. Since the second machining apparatus 23 includes two tool supports 140 capable of supporting two tools 27, the second machining apparatus 23 is capable of machining the groove 29 at least twice as fast as only having a single tool support. That is, with reference to FIG. 8A, the first tool 27 supported by the first tool support 140 machines a first edge or first side 176 of the groove 29 while, with reference to FIG. 8B, the second tool 27 supported by the second tool support 140 simultaneously machines a second edge or second side 180 of the groove 29. As the second machining apparatus 23 is advanced by the advancing mechanism, the second machining apparatus 23 moves in a single direction, which results in the two tool supports 140 moving in the same, single direction. While advancing or moving in this same, single direction, the first tool 27 machines the first side 176 of the groove 29 and the second tool 27 machines the second side 180 of the groove 29. In one example, since the tool supports 140 have similar structure, configuration and operation, the first tool support 140 is coupled to the bridge member 84 on one side of the central plane 112 and the second tool support 140 is coupled to the bridge member 84 on the other side of the central plane 112.

In other examples, if the second machining apparatus 23 only included a single tool support 140 and single tool 27, the tool support 140 would be initially positioned on the bridge member 84 to machine one of the sides of the groove 29, then upon completion of machining the one of the two sides of the groove 29, the tool support 140 would have to be uncoupled from the bridge member 84, repositioned on the bridge member 84 to machine the other side of the groove, and then recoupled to the bridge member 84.

As indicated above, the tool 27 of each tool support 140 has a wide range of adjustability. This adjustability may provide the capability of machining grooves 29 of a wide variety of depths, configurations, shapes, etc.

The second machining apparatus 23 is also capable of machining a wide range of types and sizes of flange surfaces. In some instances, flanges are relatively narrow and in other instances flanges may be relatively wide. Additionally, the flanges of pipe may be positioned in different orientations relative to the second machining apparatus 23. The second machining apparatus 23 is configured to machine a wide range of flanges sizes and orientations. Advancement mechanisms may have a limited range of travel. In one example, an advancement mechanism may have 3.5 inches of travel. This travel distance may be insufficient to machine a flange on a pipe. The second machining apparatus 23 is configured to accommodate this insufficient travel distance of the advancement mechanism. For example, the tool support 140 may be coupled to the bridge member 84 at any location along the bridge member 84. In such an example, the tool support 140 would be positioned along the bridge member 84 in a location that would be able to machine the entire flange. Also, for example, the flange may be larger than 3.5 inches in width. In such an example, the tool support 140 may be positioned in a first position along the bridge member 84 to machine a first portion of the flange, then the tool support 140 can simply be repositioned along the bridge member 84 in a second position to machine a second portion of the flange. This repositioning of the tool support 140 is easy and quick, and can occur as many times as necessary to fully machine the flange. Also, in this example where the flange may be wider in width than the 3.5 inches of travel, a plurality of tool supports 140 can be coupled to the bridge member 84 such that a first tool support 140 may be positioned to machine a first portion of the flange and the second tool support 140 can be positioned to simultaneously machine a second portion of the flange. Together, the first and second tool supports 140 would machine the entire flange. In this example, any number of tool supports 140 may be coupled to the bridge member 84 to treat an entire flange. In still other examples, it may be necessary to treat a surface of a flange past a centerline of the flange. In such an example, the tool support may be coupled to the bridge member 84 near the centerline on a first side of the centerline and the advancement distance of the advancement mechanism (for example, 3.5 inches) would advance the tool support 140 past the centerline to the second side of the centerline.

Conventional pipe machining apparatuses have a fixed amount of advancement travel and a particular type of pipe machining apparatus must be used based on the size of the flange to be machined. In such instances, several machines must be purchased in order to machine a wider range of flange sizes. This is an expensive endeavor in order to machine a wide range of flanges.

The second machining apparatus 23 of the present disclosure is capable of machining a wide range of flange sizes itself. Furthermore, the second machining apparatus 23 is configured to advance the tool 27 and tool supports 140 in both an inside-out direction and an outside-in direction. For example, when you position a tool support 140 on one side of the centerline, the tool support 140 may be advancing in an inside-out direction and when you position a tool support 140 on the other side of the centerline, the tool support 140 may be advancing in an outside-in direction. In some examples, the second machining apparatus 23 may advance tool supports 140 in both directions. That is, if a first tool support 140 is coupled to the bridge member 84 on a first side of the centerline and a second tool support 140 is coupled to the bridge member 84 on a second side of the centerline, the first tool support 140 may advance in an outside-in direction and the second tool support 140 may advance in an inside-out direction.

Figure 9:
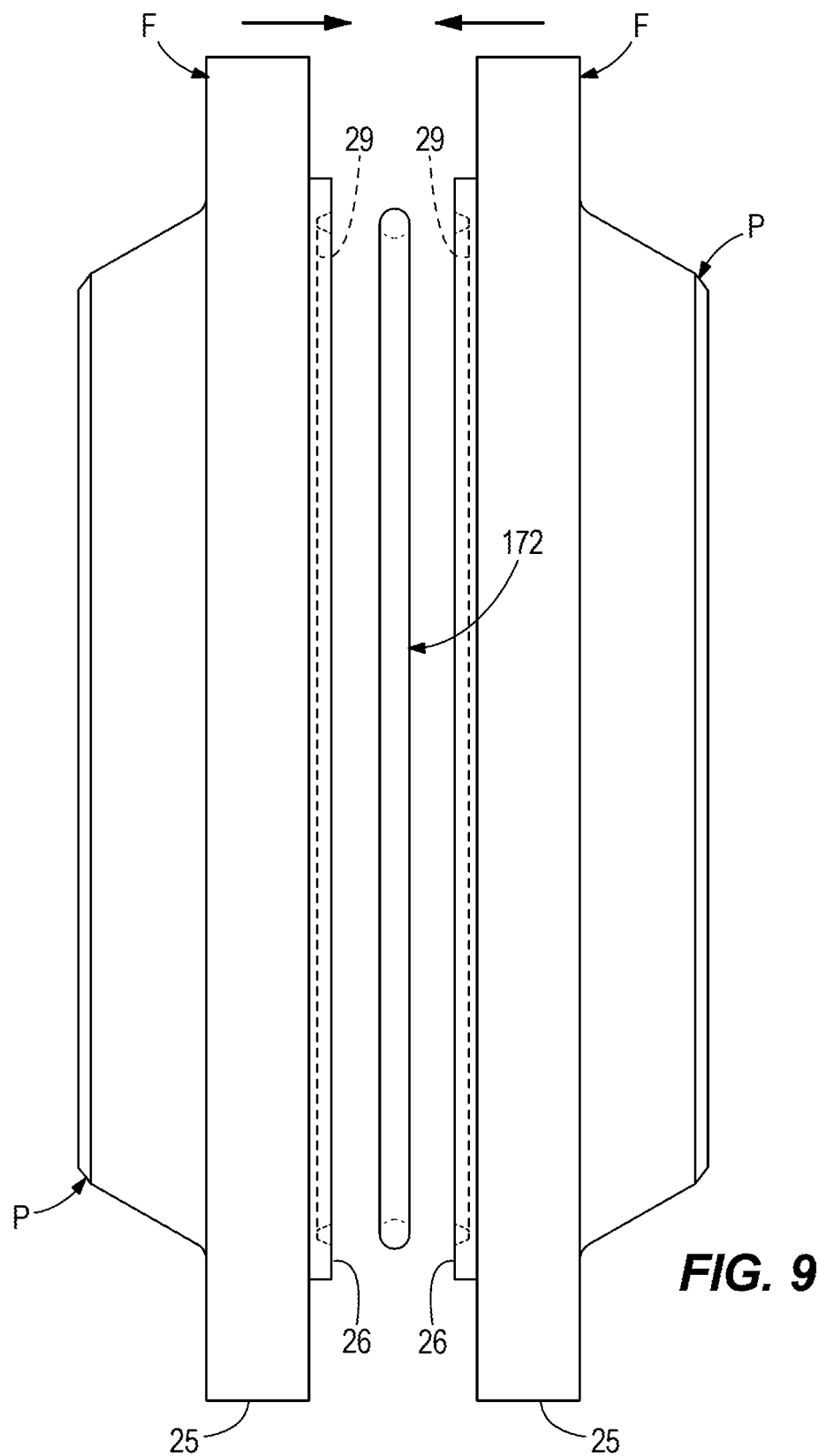
FIG. 9 is an elevational view of two exemplary opposing pipe flanges with a groove machined into each flange via the first machining operation and a sealing member aligned with and positionable in the two grooves to provide a seal between the two flanges when the flanges are coupled together, in accordance with one embodiment.

With reference to FIG. 9, one example of a ring-type joint is illustrated. In this example, the second machining apparatus 23 is used to machine a groove 29 into opposing surfaces 26 of opposing flanges F. In some examples, the surfaces 26 in which the grooves 29 are defined may be raised surfaces or surfaces that otherwise project beyond the flanges F. A sealing member 172 having a thickness greater than the combined depths of the grooves 29 may be aligned with and positioned in the grooves 29. The flanges F are then moved together and coupled together. As the flanges F move together and/or when the flanges F are coupled together, the sealing member 172 is crushed or otherwise deformed between the two flanges F to provide an adequate seal between the flanges F.

Figure 10:
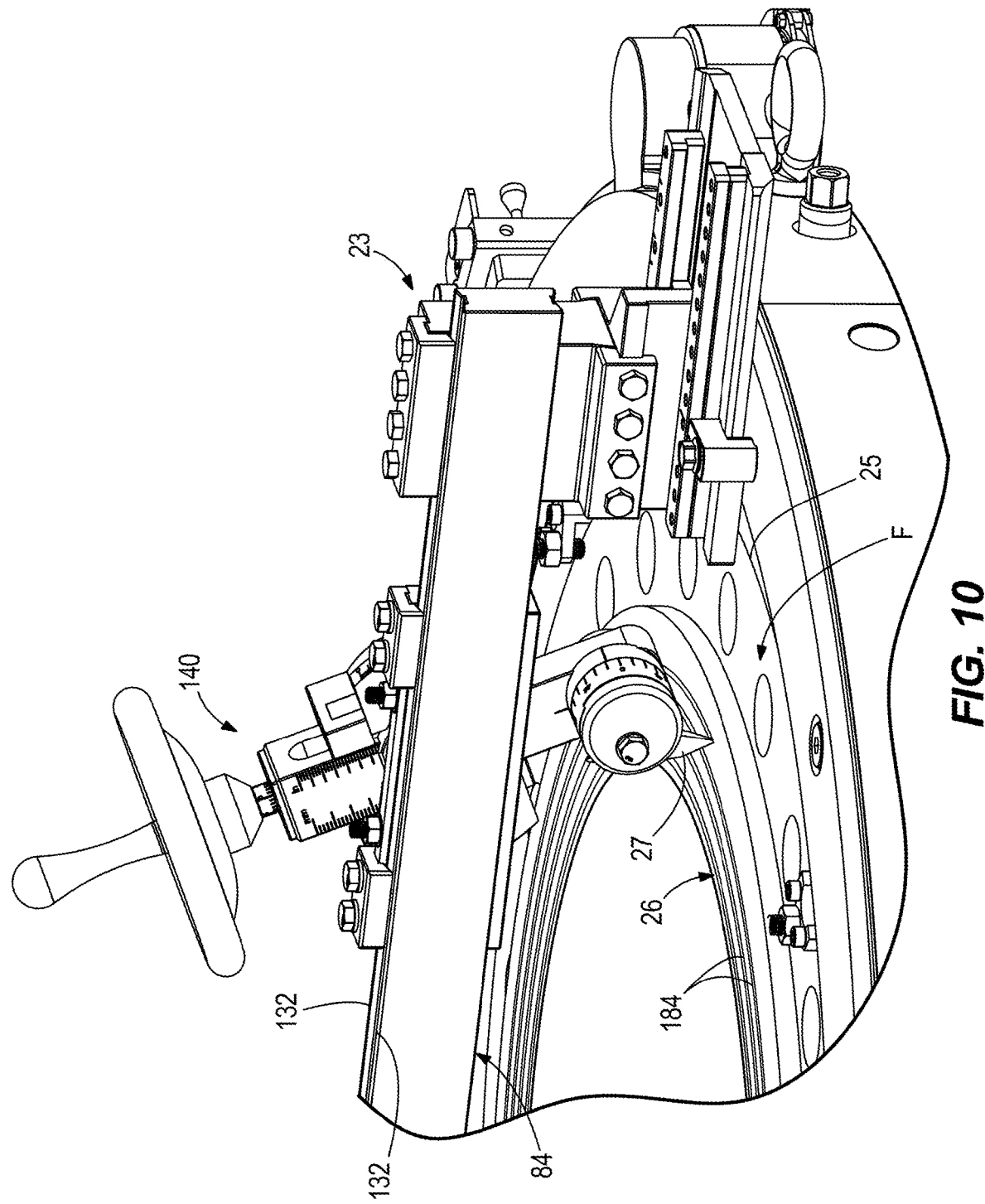
FIG. 10 is a top perspective view of a portion of the pipe machining apparatus, the machining apparatus shown in FIG. 2 and the flange of the pipe, wherein the tool support and tool are configured to perform a second machining operation to the flange of the pipe, in accordance with one embodiment.

Referring now to FIG. 10, a portion of the second machining apparatus 23 is shown and is utilized to perform a third machining operation different than the first and second machining operations. In one example, the tool 27 is used to machine a surface 26 of the flange F such that the surface 26 is roughened or otherwise not smooth. This roughening operation may be performed and/or achieved in a variety of manners. In the illustrated example, the tool 27 is aligned with an edge (inner or outer depending on location of tool support 140 on bridge member 84) of the surface 26 to be roughened and the tool carrier 32 begins to rotate the second machining apparatus 23. The tool 27 cuts a small groove 184 into the surface 26 and the second machining apparatus 23 is advanced via the advancement mechanism to advance the tool 27 relative to the surface 26 to be roughened. In this example, the result would be a record-groove-type cut in the surface 26 of the flange F as illustrated in FIG. 10. In some examples, this type of flange surface machining may be referred to as flange facing.

Since the tool support 140 may be coupled anywhere along the bridge member 84, the second machining apparatus 23 may machine the surface 26 of the flange F either in a direction from outside-in or in a direction from inside-out. This capability depends on the direction the second machine apparatus 23 is advanced by the advancing mechanism, and the tool support 140 and tool 27 are positioned near the appropriate end of the bridge member 84 and on the appropriate side of the central plane 112 of the bridge member 84. In some examples, the second machining apparatus 23 may utilize two tool supports 140 and two tools 27 to perform this third machining operation. In such an example, the first tool support 140 and first tool 27 may be positioned near an edge of the surface 26 to be roughened and the second tool support 140 and tool 27 may be positioned near a middle of the surface 26 to be roughened. As the second machining apparatus 23 advances, the first tool 27 can machine an outer half of the flange surface 26 and the second tool 27 can machine the inner half of the flange surface 26, or vice versa. Using two tool supports 140 can significantly reduce the time required to machine the surface 26 of the flange F.

Figure 11:
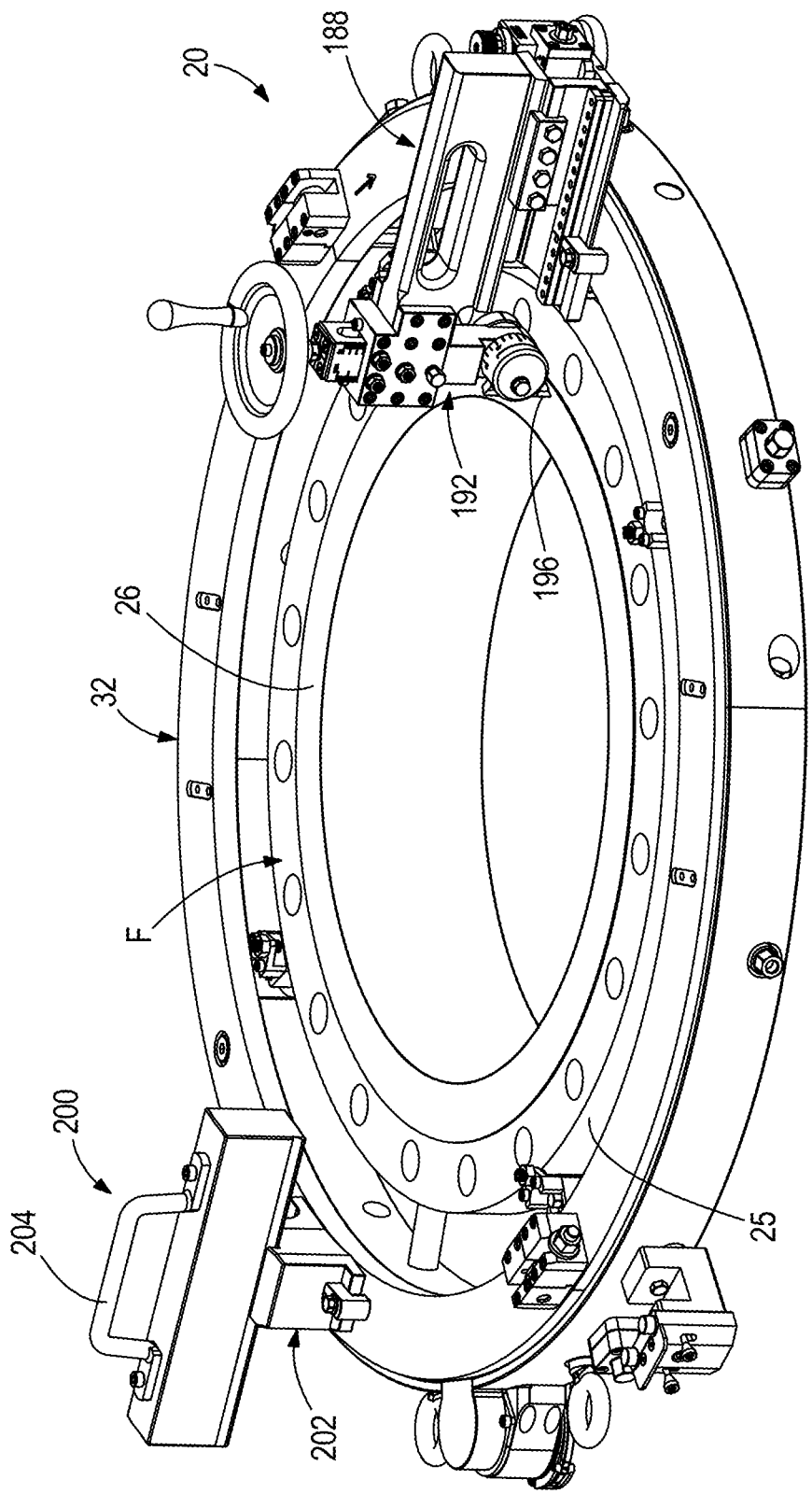
FIG. 11 is a top perspective view of the pipe machining apparatus shown in FIGS. 1 and 2 coupled to a flange of a pipe and supporting another example of a machining accessory, wherein the machining accessory is configured to perform the second machining operation to the flange, in accordance with one embodiment.
Figure 12:
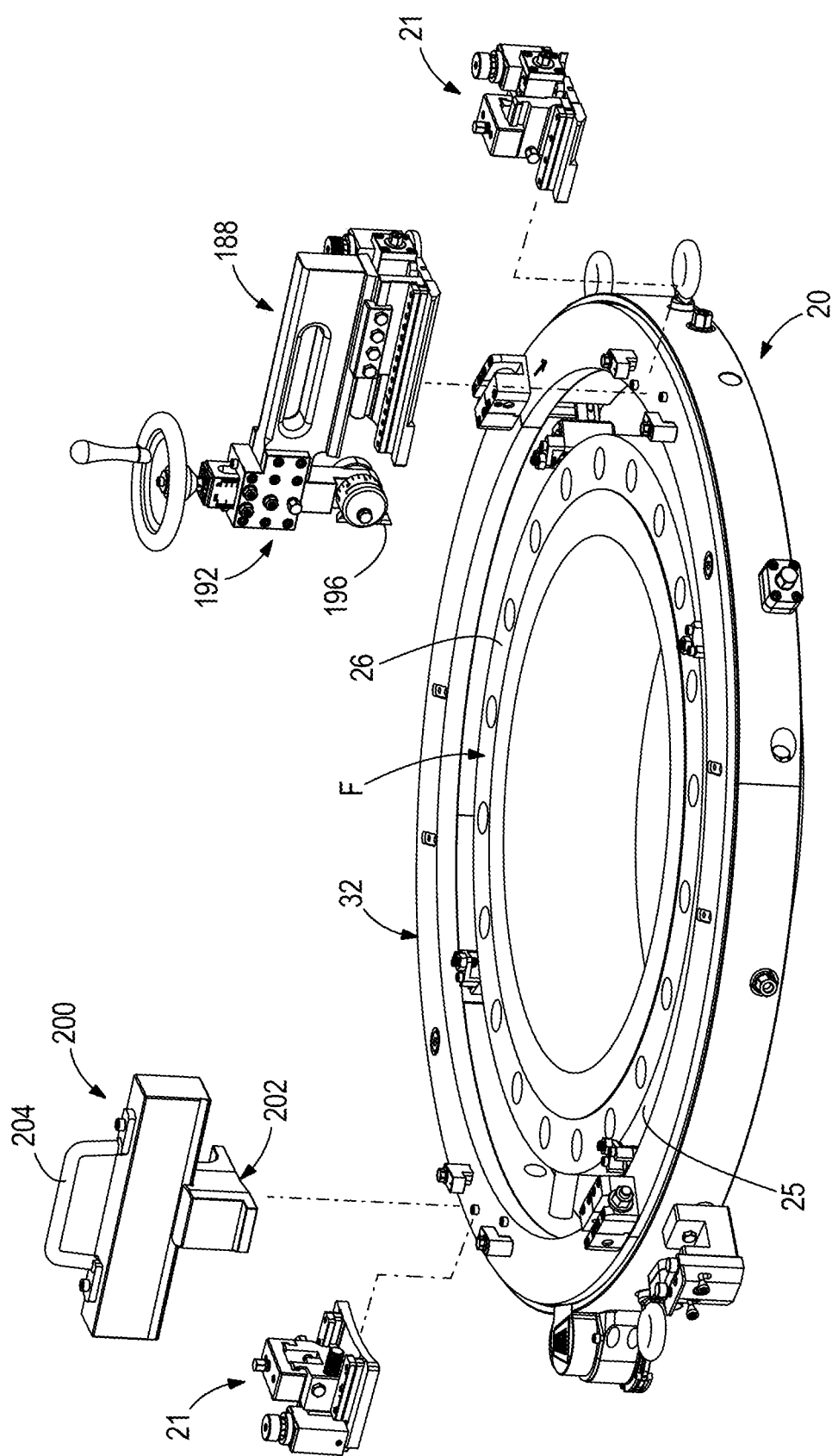
FIG. 12 is an exploded view of the pipe machining apparatus shown in FIG. 11 showing the interchangeable coupling of a plurality of machining accessories including the exemplary tool support shown in FIGS. 1 and 3 and the machining accessory shown in FIG. 11, in accordance with one embodiment.

Referring now to FIGS. 11-14, the pipe machining apparatus 20 is shown with one example of a third machining apparatus 188 coupled thereto. As indicated above, the pipe machining apparatus 20 may include a plurality of interchangeable machining apparatuses or accessories. The illustrated example of the third machining apparatus 188 may be interchangeably coupled to the tool carrier 32 of the pipe machining apparatus 20 similarly to the first and second machining apparatuses 21, 23. FIG. 12 illustrates the third machining apparatus 188 interchangeably couplable to the pipe machining apparatus 20 with the first machining apparatus 21 in order to simplify the drawings; however, it should be understood that the third machining apparatus 188 may be interchangeably couplable to the pipe machining apparatus 20 with any number of machining apparatuses. In this manner, a system or a kit is provided that includes the pipe machining apparatus 20 and a plurality of machining apparatuses or accessories 21, 23, 188 that may be interchangeably coupled to the pipe machining apparatus 20 to perform a wide variety of machining operations. Conventionally, a user would have had to purchase a separate machine for each desired type of machining operation. For example, a user would have had to purchase two or three different machines in order to perform the two or three exemplary machining operations descried herein. Purchasing a plurality of separate machines can be an expensive endeavor for an individual since each machine is expensive.

Figure 13:
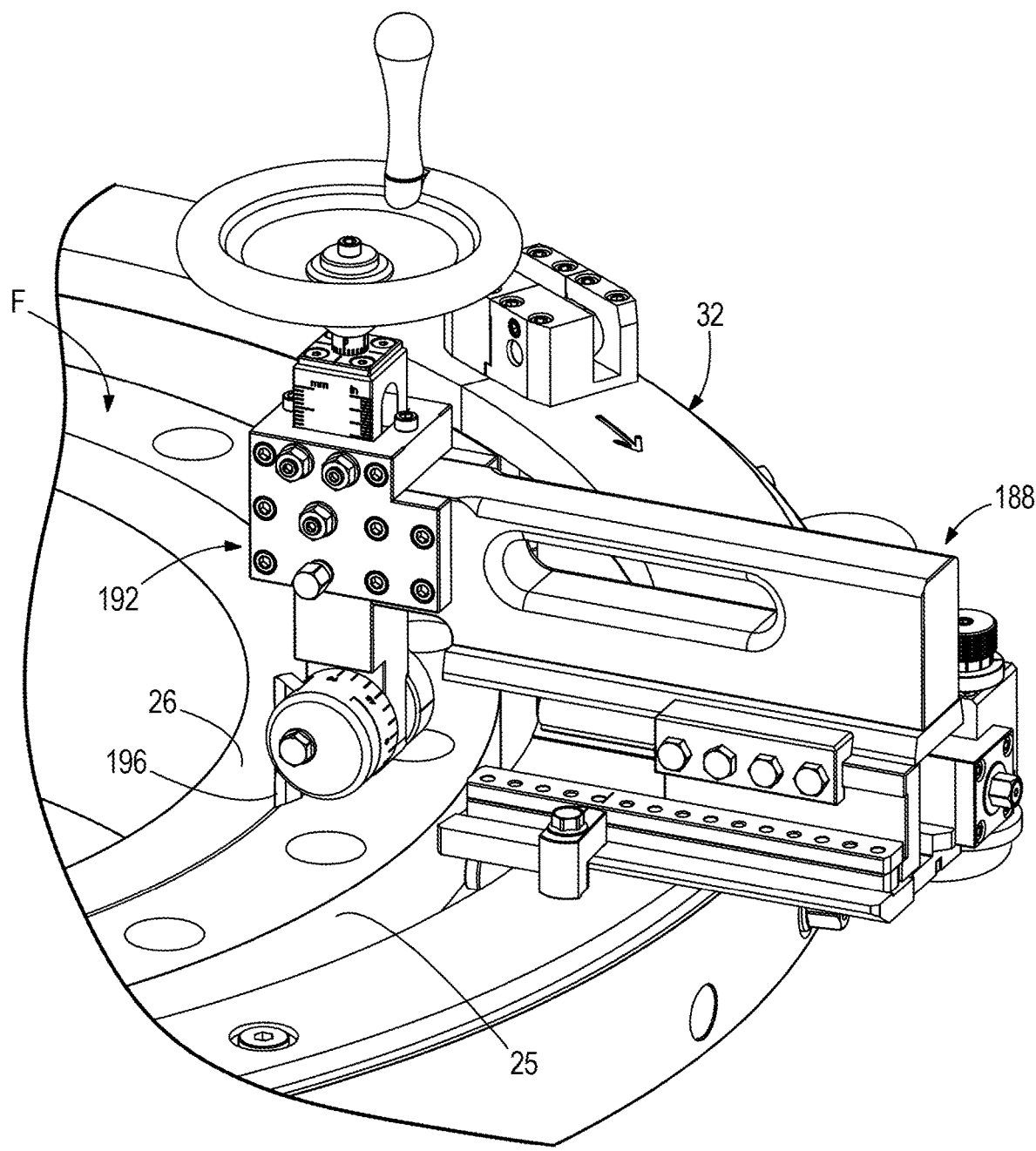
FIG. 13 is an enlarged top perspective view of a portion of the pipe machining apparatus and the machining accessory shown in FIG. 11 and capable of performing the second machining operation to a surface of the flange, in accordance with one embodiment.
Figure 14:
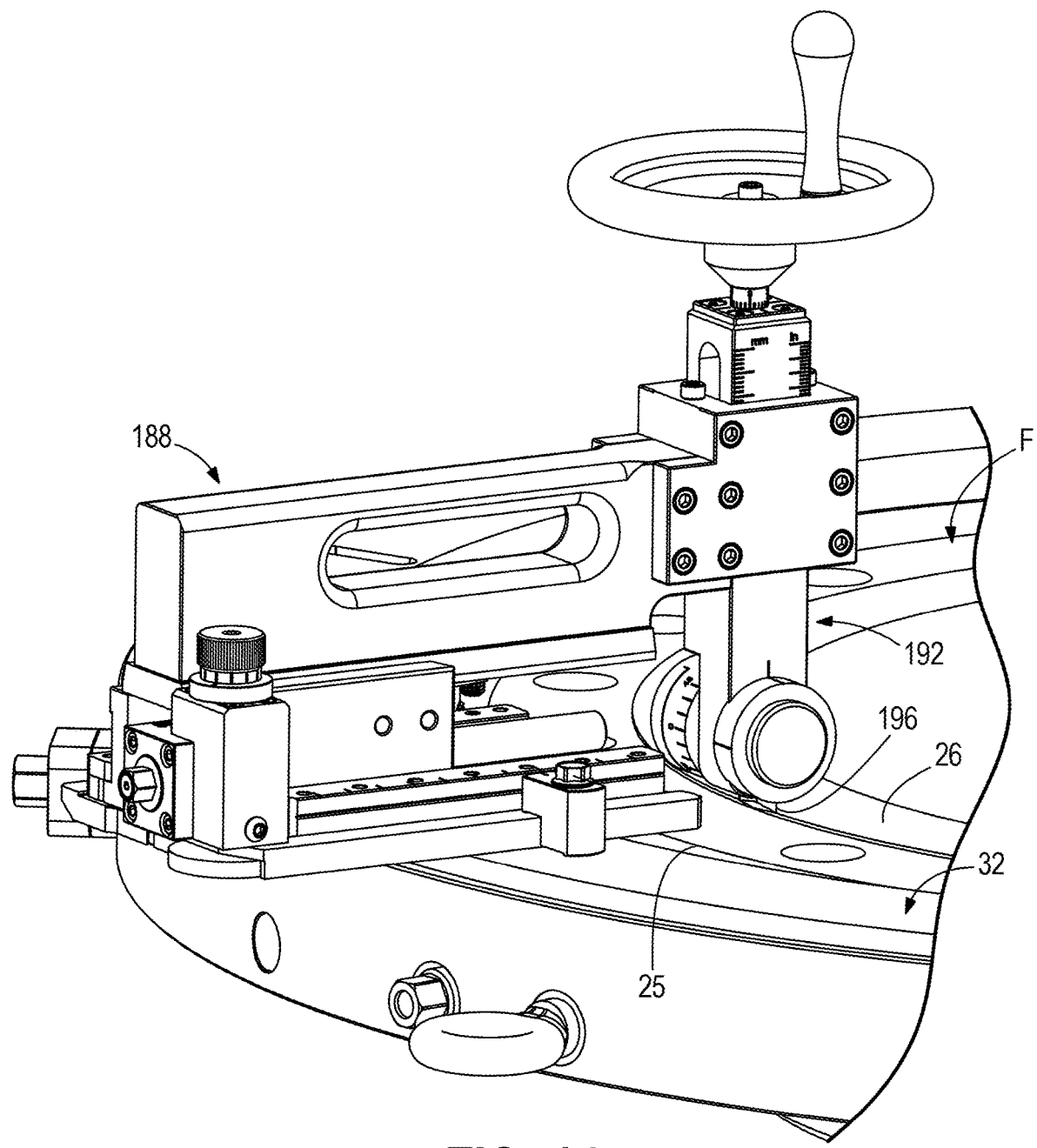
FIG. 14 is another enlarged top perspective view of a portion of the pipe machining apparatus and the machining accessory shown in FIG. 11, in accordance with one embodiment.

Referring now to FIGS. 11, 13 and 14, the third machining apparatus 188 includes a tool support 192 and a tool 196. The third machining apparatus 188 is capable of performing flange facing or roughening a surface 26 of the flange F similarly to the flange face or surface roughening performed by the second machining apparatus 23.

With reference to FIGS. 11-14, a pipe machining apparatus 20 is capable of having only a single third machining apparatus 188 coupled thereto. In such examples, the pipe machining apparatus 20 may include a counter-balance member 200 coupled to the tool carrier 32. The counter-balance member 200 may have a sufficient weight to counter-balance the weight of the single third machining apparatus 188 and ensure balanced operation of the pipe machining apparatus 20. The illustrated example of the counter-balance member 200 is only one example of many different configurations, shapes, styles, etc., and all of such examples are within the spirit and scope of the present disclosure. In the illustrated example, the counter-balance member 200 includes a base 202 capable of being coupled to the tool carrier 32 in a manner similar to the first, second and third machining apparatuses 21, 23, 188. In one example, the counter-balance member 200 may be adjusted or advanced relative to the base 202 and the tool carrier 32 in a manner similar to the first, second and third machining apparatuses 21, 23, 188. That is, the counter-balance member 200 may be advanced by the advancement mechanism similarly to the third machining apparatus 188 to correspond to the advancement of the third machining apparatus 188. In this manner, a proper amount of counter-balance weight may be provided by the counter-balance member 200 as the third machining apparatus 188 is advanced to machine the flange F. In the illustrated example, the counter-balance member 200 includes a handle 204 to assist with manipulation and handling of the counter-balance member 200. In another example, the counter-balance member 200 may be coupled to the tool carrier 32 and may not be advanced by the advancement mechanism. In this example, the counter-balance member 200 remains fixed in place relative to the tool carrier 32 as the apparatus 188 advances or moves relative to the tool carrier 32.

The components and resulting functionalities of the pipe machining apparatuses included herein are adapted to be included in any size pipe machining apparatus to machine any size pipe and/or flange, and operate in the same manner, thereby providing a modularity capability to the present disclosure. That is, for example, whether the pipe machining apparatus is adapted to cut pipes of 12 inches or 120 inches, the components are all adapted to be included in any possible size pipe machining apparatus and operate in the same manner.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus may be utilized in any orientation and use of such terms is intended to correspond to the exemplary orientation of the pipe machining apparatus illustrated in the drawings. The use of these terms in association with the pipe machining apparatus is not intended to limit the pipe machining apparatus to a single orientation or to limit the pipe machining apparatus in any manner.

It should also be understood that use of numerical terms such as, for example, "first", "second", "third", etc., should not be interpreted to imply an order or sequence of components or functions. Moreover, use of these numerical terms is not intended to pertain to only the component and/or function with which they are utilized. Rather, the use of these numerical terms are merely used to assist the reader with understanding the subject matter of the present disclosure. For example, one of the machining apparatuses in the specification may be referenced as a "first machining apparatus", but the same machining apparatus may be referenced differently in the claims (e.g., second or third machining apparatus).

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
    a frame;
    a tool carrier coupled to and rotatable relative to the frame, wherein the tool carrier defines an opening therein;
    a bridge member coupled to the tool carrier and extending across the opening of the tool carrier;
    a first tool support mounted on the bridge member and supporting a first tool, the first tool being configured to perform a first machining operation as the tool carrier rotates relative to the frame, the first tool support being movable relative to the bridge member to be positioned at a variety of positions along the bridge member;
    a second tool support mounted on the bridge member and supporting a second tool, the second tool being configured to perform a second machining operation as the tool carrier rotates relative to the frame, the second tool support being movable relative to the bridge member to be positioned at a variety of positions along the bridge member; and
    an advancing mechanism coupled to the bridge member and configured to move the bridge member, the first tool support, the first tool, the second tool support, and the second tool relative to the tool carrier.

2. The pipe machining apparatus of claim 1, wherein each machining operation is at least one of facing a flange of a pipe and cutting a groove in a flange of a pipe.

3. The pipe machining apparatus of claim 1, wherein, during movement as a result of the advancing mechanism:
    the first tool moves from an outer diameter of a flange of a pipe toward an inner diameter of the flange, and
    the second tool moves from the inner diameter of the flange toward an outer diameter of the flange.

4. The pipe machining apparatus of claim 1, wherein each tool support includes a base coupled to the bridge member and a movable member coupled to the base, each movable member being movable relative to the respective base.

5. The pipe machining apparatus of claim 1, wherein the bridge member is symmetrical about a central plane extending through a center of the bridge member and generally parallel to first and second opposing surfaces of the bridge member.

6. The pipe machining apparatus of claim 1, further comprising
    a third tool support and a third tool supported by the third tool support, the third tool being configured to perform a third machining operation which is different than the first and second machining operations, wherein the third tool support and the first and second tool supports and bridge member are interchangeably couplable to and rotatable with the tool carrier.

7. The pipe machining apparatus of claim 6, wherein the tool carrier includes a first coupling location and a second coupling location, wherein the third tool support is coupled to the tool carrier at one of the first coupling location or the second coupling location, and wherein the bridge member is coupled to the tool carrier at both the first coupling location and the second coupling location.

8. The pipe machining apparatus of claim 7, wherein, when the third tool support is coupled to the one of the first coupling location and the second coupling location, a counter-balance is coupled to the tool carrier at the other of the first coupling location and the second coupling location.

9. A pipe machining apparatus comprising:
    a frame;
    a tool carrier coupled to and rotatable relative to the frame, wherein the tool carrier defines an opening therein; and
    a bridge member coupled to the tool carrier and extending across the opening of the tool carrier;
    a first tool support coupled to the bridge member and supporting a first tool, the first tool being configured to perform a first machining operation as the tool carrier rotates relative to the frame; and
    a second tool support coupled to the bridge member and supporting a second tool, the second tool being configured to perform a second machining operation as the tool carrier rotates relative to the frame,
    wherein when each machining operation is facing a flange, the first and second tools are configured to face the flange, and
    wherein when each machining operation is cutting a groove, the first tool is configured to cut a first edge of the groove and the second tool is configured to cut a second edge of the groove.

10. A pipe machining apparatus comprising:
    a frame;
    a tool carrier coupled to and rotatable relative to the frame, wherein the tool carrier defines an opening therein; and
    a bridge member coupled to the tool carrier and extending across the opening of the tool carrier;
    a first tool support coupled to the bridge member and supporting a first tool, the first tool being configured to perform a first machining operation as the tool carrier rotates relative to the frame; and
    a second tool support coupled to the bridge member and supporting a second tool, the second tool being configured to perform a second machining operation as the tool carrier rotates relative to the frame,
    wherein the first machining operation is facing a flange of a pipe and the second machining operation is cutting a groove in the flange of the pipe.

11. A pipe machining apparatus comprising:
    a frame;
    a tool carrier coupled to and rotatable relative to the frame, wherein the tool carrier defines an opening therein;
    a bridge member coupled to the tool carrier and extending across the opening of the tool carrier, the bridge member includes a first pair of angled surfaces angling toward each other in a first side of the bridge member and extending along a length of the bridge member, and a second pair of angled surfaces angling toward each other in a second side of the bridge member opposite the first side and extending along the length of the bridge member;
    a first tool support mounted on the bridge member and supporting a first tool, the first tool being configured to perform a first machining operation as the tool carrier rotates relative to the frame, the first tool support engaging with the first pair of angled surfaces when coupled to the bridge member; and a second tool support mounted on the bridge member and supporting a second tool, the second tool being configured to perform a second machining operation as the tool carrier rotates relative to the frame, the second tool support engaging with the second pair of angled surfaces when coupled to the bridge member.

12. The pipe machining apparatus of claim 11, wherein the bridge member is symmetrical about a central plane extending through a center of the bridge member and generally parallel to first and second opposing surfaces of the bridge member.

* * * * *